US 6,570,112 B2

(12) United States Patent
Lin

(10) Patent No.: US 6,570,112 B2
(45) Date of Patent: May 27, 2003

(54) PUSH BUTTON ASSEMBLY

(75) Inventor: Wan Cheng Lin, Taipei (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 175 days.

(21) Appl. No.: 09/750,864

(22) Filed: Dec. 28, 2000

(65) Prior Publication Data

US 2002/0084177 A1 Jul. 4, 2002

(51) Int. Cl.$^7$ ............................................... H01H 13/70
(52) U.S. Cl. ...................... 200/343; 200/276; 200/290; 200/520
(58) Field of Search ................................ 200/276, 277, 200/276.1, 277.1, 296, 520, 341–345

(56) References Cited

U.S. PATENT DOCUMENTS

| 4,977,300 A | * | 12/1990 | Schroeder | 200/293 |
| 5,577,601 A | * | 11/1996 | Chung et al. | 200/292 |
| 5,813,520 A | * | 9/1998 | Reier et al. | 200/330 |
| 5,990,432 A | * | 11/1999 | Kuroda | 200/343 |
| 6,160,232 A | * | 12/2000 | Lin | 200/296 |

* cited by examiner

Primary Examiner—Anh Mai
Assistant Examiner—Kyung Lee
(74) Attorney, Agent, or Firm—Wei Te Chung

(57) ABSTRACT

A push button assembly (30) includes a spring member (32) and a button (34). The spring member is secured to a computer bezel (10), and includes a rod (36), a pair of U-shaped crooks (38, 40), and a deformable arm (42) extending from one of the crooks. The deformable arm includes a connecting portion (44), a receiving portion (48) and a neck (50). The button is movably received in an aperture (16) of the bezel. The button defines a pair of grooves (54) which movably accommodate the receiving portion, so that the button can slide freely along the receiving portion. Thus the button can move freely in the aperture of the bezel.

13 Claims, 5 Drawing Sheets

PUSH BUTTON ASSEMBLY

BACKGROUND OF THE INVENTION

1. Field of the Invention

The present invention relates to a push button assembly, and more particularly to a push button assembly for a computer bezel and a floppy disk drive.

2. Related Art

Personal computers usually include floppy disk drives (FDDs). A push button assembly is generally used to eject a floppy disk (FD) from a FDD.

FIG. 5 illustrates a conventional push button assembly for an FDD. A fixed member 2 secures a spring arm 5 to an inside surface of a computer bezel 3. A button 1 is integrally formed at an end of the spring arm 5, and is accommodated in a hole 6 defined in the bezel 3. When the button 1 is pushed inwardly, it touches the FDD and thereby causes the FD to slide out of the FDD. The button 1 then returns to its original position due to resiliency of the spring arm 5.

In such operation, the button 1 rotates about the fixed member 2. Because the button 1 travels along a curved path, it often interferes with the bezel 3 in the hole 6. Thus the button 1 does not always fully return to its original position (see FIG. 6), and subsequent operation of the assembly is impaired.

A reliable push button assembly which overcomes the above problems of the related art is strongly desired.

SUMMARY OF THE INVENTION

Accordingly, an object of the present invention is to provide a push button assembly which operates reliably.

To achieve the above-mentioned object, a push button assembly in accordance with a preferred embodiment of the present invention comprises a spring member and a button. The spring member is secured to a computer bezel, and includes a rod, a pair of U-shaped crooks, and a deformable arm extending from one of the crooks. The deformable arm includes a connecting portion, a receiving portion and a neck. The button is movably received in an aperture of the bezel. The button defines a pair of grooves which movably accommodate the receiving portion, so that the button can slide freely along the receiving portion. Thus the button can move freely in the aperture of the bezel.

Other objects, advantages and novel features of the present invention will be drawn from the following detailed embodiments of the present invention with attached drawings, in which:

DETAILED DESCRIPTION OF THE PREFERRED EMBODIMENTS

Figure 1:
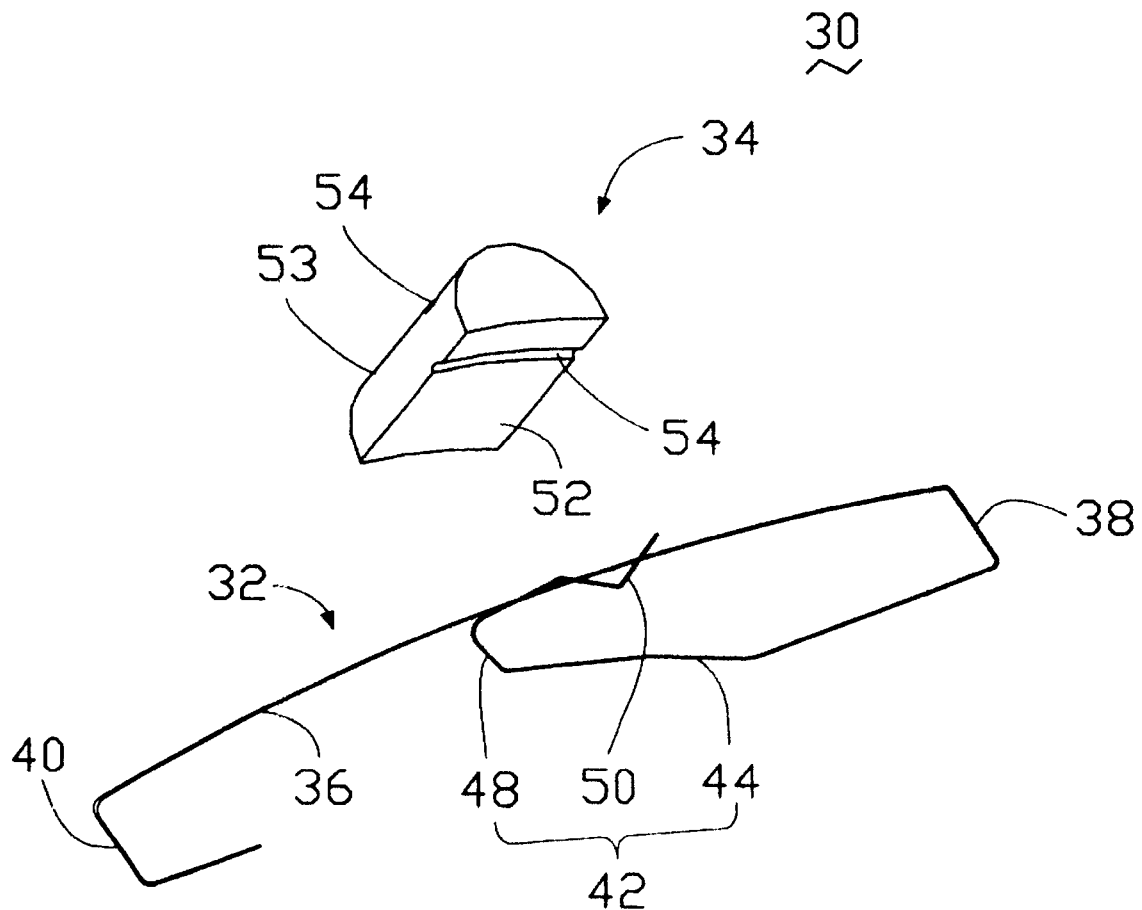
FIG. 1 is an exploded view of a push button assembly in accordance with a preferred embodiment of the present invention.

Referring to FIG. 1, a push button assembly 30 in accordance with a preferred embodiment of the present invention comprises a spring member 32 and a button 34 movably engaged with the spring member 32.

The spring member 32 comprises an elongated rod 36, a pair of U-shaped first and second crooks 38, 40 and a deformable arm 42. The first and second crooks 38, 40 extend toward each other from respective opposite ends of the rod 36. The deformable arm 42 extends from a free end of the first crook 38, and comprises a connecting portion 44, a generally U-shaped receiving portion 48 and a V-shaped neck 50. The connecting portion 44 connects the deformable arm 42 to the first crook 38. The connecting portion 44 extends from the first crook 38 in a direction toward the rod 36, and slants away from the computer bezel (see FIGS. 2 and 3). The receiving portion 48 substantially opposes the first crook 38. A free end (not labeled) of the receiving portion 48 is proximate to the rod 36. The neck 50 extends from the free end (not labeled) of the receiving portion 48, toward the first crook 38.

The button 34 is substantially semi-cylindrical, and comprises a concave flank 52 and a convex flank 53. A pair of parallel grooves 54 is respectively defined in the concave flank 52 and the convex flank 53, for engaging with the receiving portion 48 of the spring member 32. The receiving portion 48 is dimensioned to movably accommodate the button 34. A shortest distance between the neck 50 of the spring member 32 and the connecting portion 44 of the spring member 32 is less than a distance between the grooves 54 of the button 34.

Figure 2:
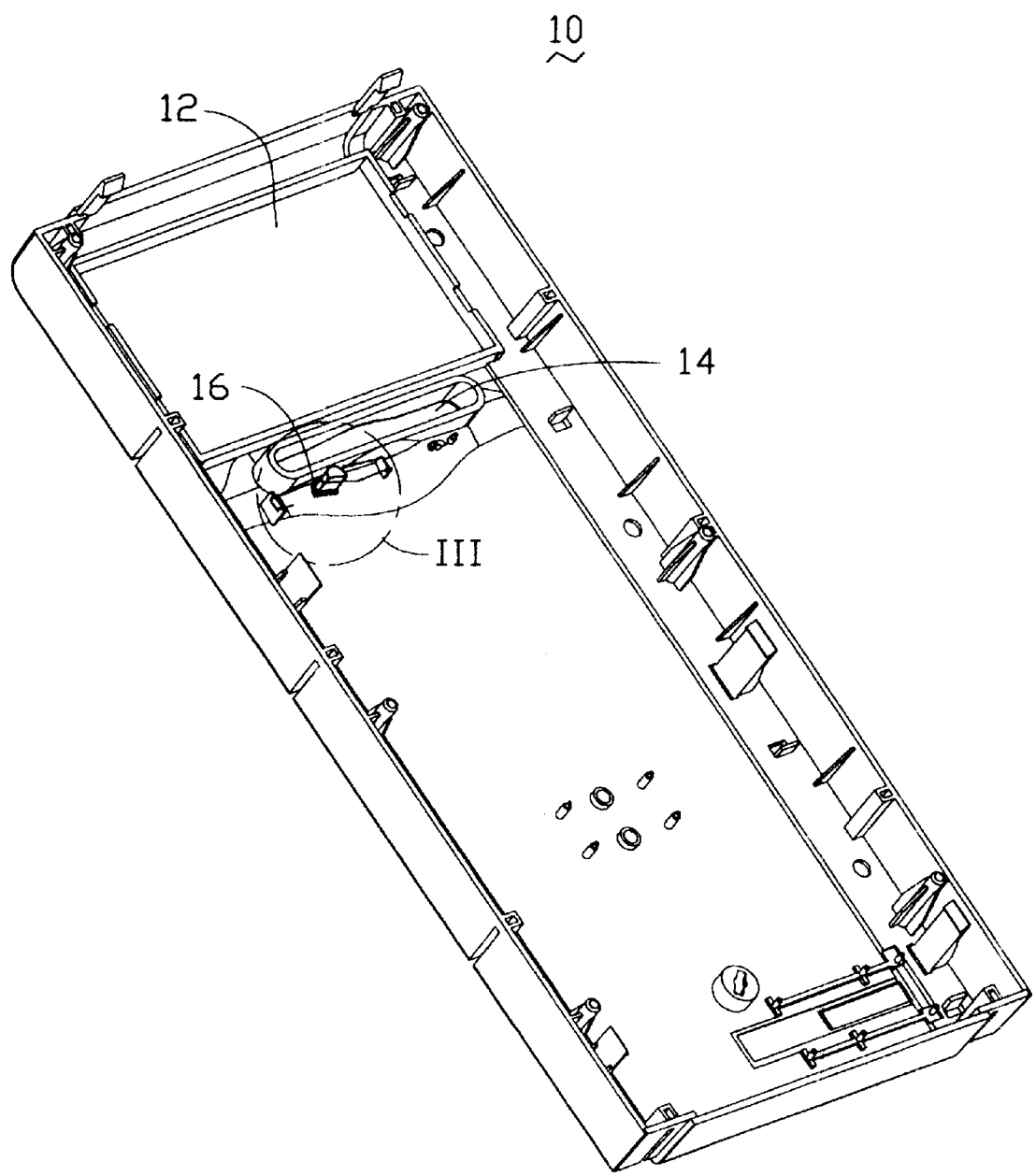
FIG. 2 is a view of the push button assembly of FIG. 1, fully assembled and movably secured to a computer bezel.
Figure 3:
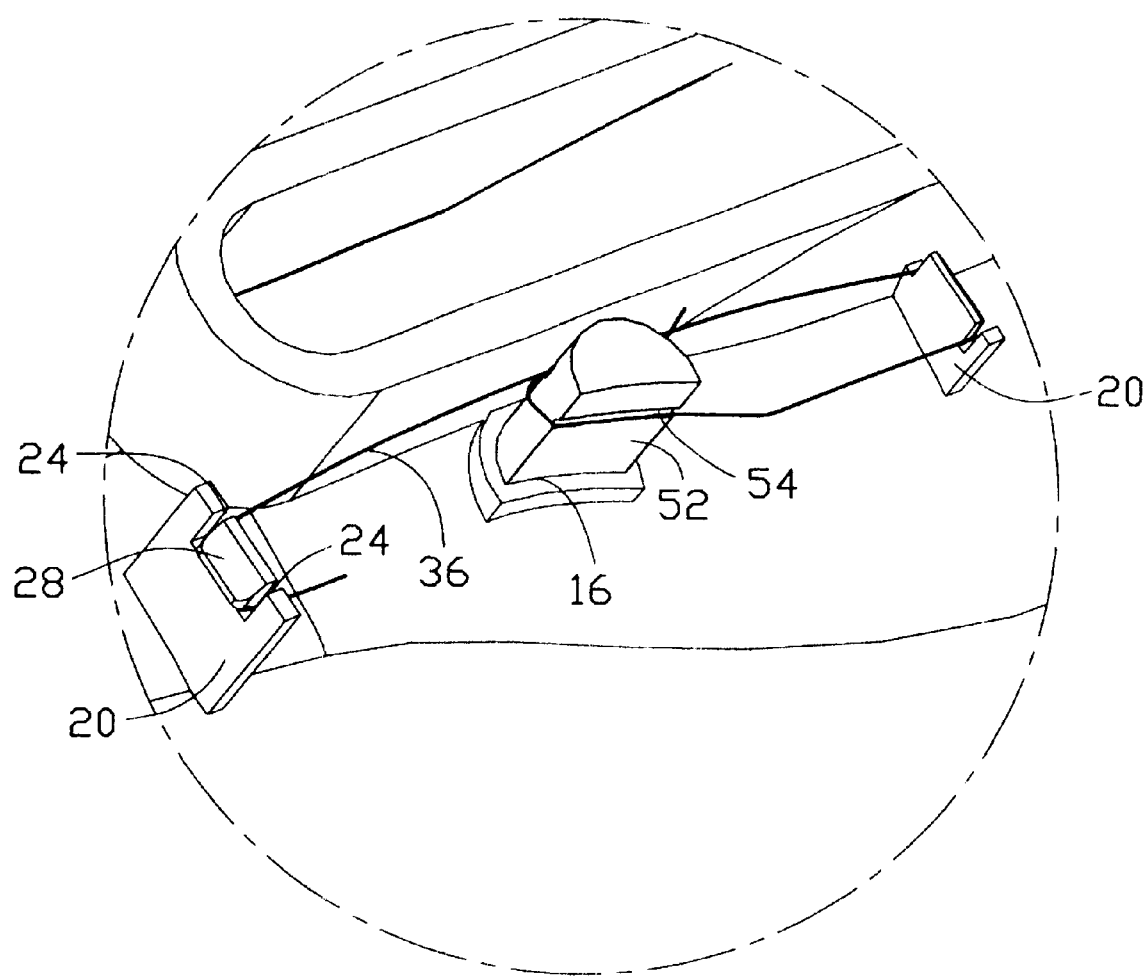
FIG. 3 is an enlarged view of the circled portion III of FIG. 2.

Referring to FIG. 2, a computer bezel 10 defines an opening 12 and a horizontal slot 14 below the opening 12. The horizontal slot 14 provides access to a floppy disk drive (FDD) (not shown) installed adjacent the bezel 10. An aperture 16 is defined in the bezel 10 below the slot 14, for movably receiving the button 34 therein. Referring particularly to FIG. 3, a pair of locking blocks 20 is formed inwardly from an inner surface of the bezel 10 on either side of the aperture 16. Each block 20 defines a pair of cutouts 24 in an inner edge thereof, and forms a catch 28 between the cutouts 24. Each catch 28 forms a lip (not labeled), for retaining the corresponding crook 38, 40 of the button assembly 30.

In assembly, the grooves 54 of the button 34 are respectively engaged with the connecting portion 44 and the neck 50 of the spring member 32. The button 34 is then pressed toward the receiving portion 48, causing the neck 50 and the receiving portion 48 to deformably expand away from the connecting portion 44. Thus the button 34 is allowed to pass the neck 50 and the connecting portion 44, and be received in the receiving portion 48. The neck 50 and the receiving portion 48 thereupon return back toward their original positions, and the neck 50 thereafter prevents the button 34 from moving out of the receiving portion 48. The button 34 is then received in the aperture 16 of the bezel 10. The crooks 38, 40 of the button assembly 30 are inserted into the corresponding cutouts 24 of the blocks 20. The catches 28 of the blocks 20 retain the U-shaped crooks 38, 40 in the blocks 20. The spring member 32 of the push button assembly 30 is thus secured to the bezel 10. The push button assembly 30 is thereby slidably secured on the bezel 10.

The push button assembly 30 of the present invention has at least the following advantages:

When the button 34 of the push button assembly 30 is pressed inwardly, it causes the deformable arm 42 to deformably rotate about the block 20 at the first crook 38. Because the receiving portion 48 of the deformable arm 42 is dimensioned to slidably accommodate the button 34, the button 34 can slide freely along the receiving portion 48. This ensures that the button 34 can move freely in the aperture 16 of the bezel 10.

Figure 4:
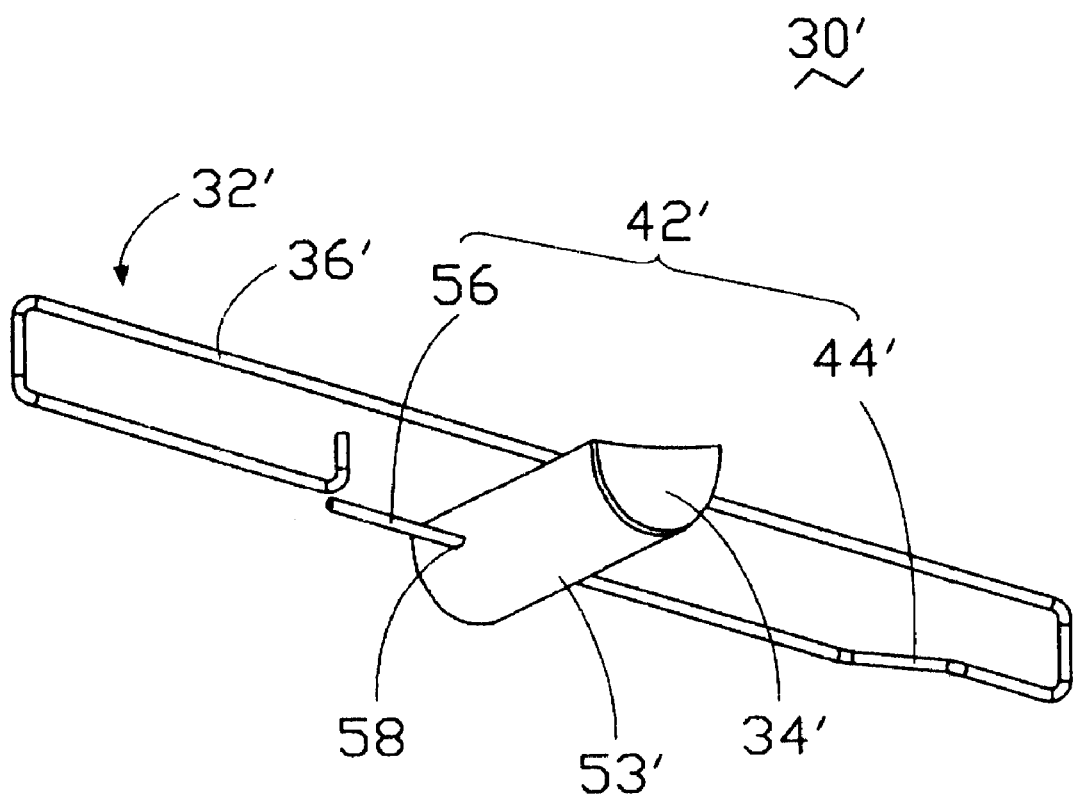
FIG. 4 is an assembled view of a push button assembly in accordance with an alternative embodiment of the present invention.
Figure 5:
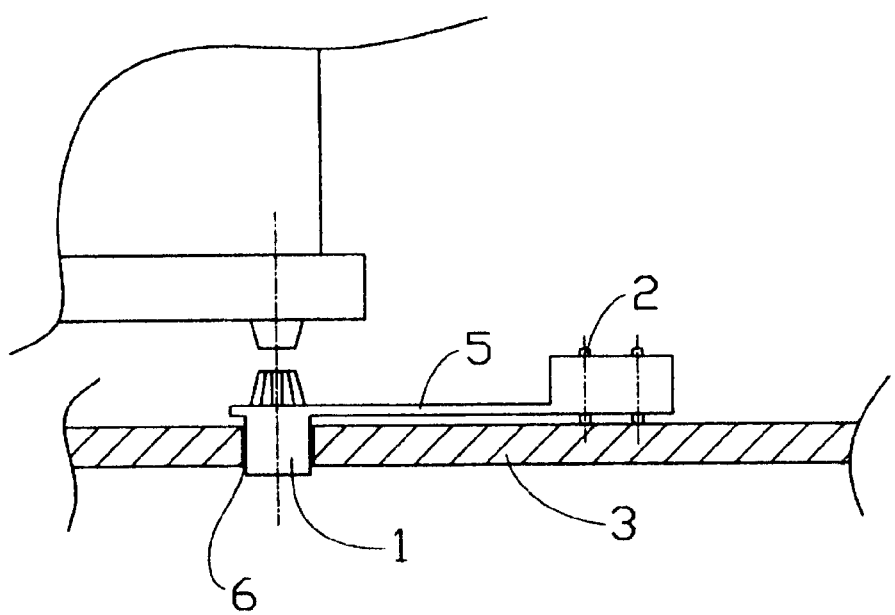
FIG. 5 is a cross-sectional view of a conventional push button assembly.
Figure 6:
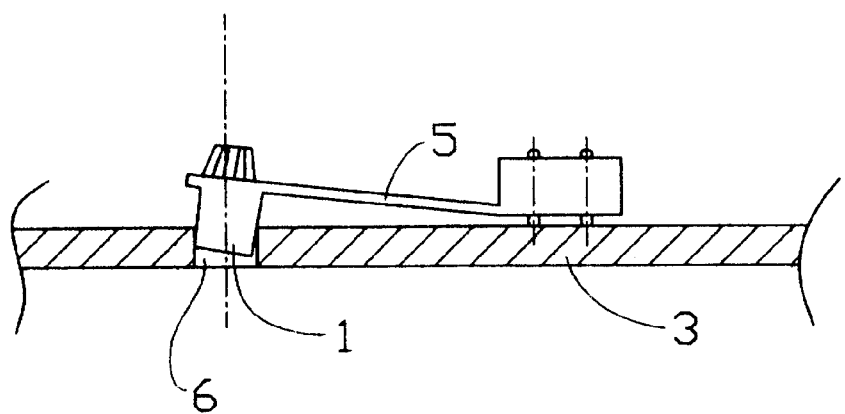
FIG. 6 is similar to FIG. 5, but showing a button of the push button assembly unable to return to its original position.

FIG. 4 shows a push button assembly 30' in accordance with an alternative embodiment of the present invention. The push button assembly 30' is similar to the push button assembly 30 of the preferred embodiment. However, a deformable arm 42' comprises a connecting portion 44' which slants toward a computer bezel (not shown), and a free end portion 56 which is parallel to a rod 36'. A button 34' defines a through hole 58 in a convex flank 53' thereof, for slidably receiving the free end portion 56. For brevity, a detailed description of the push button assembly 30' is omitted herein. Instead, reference is made to the detailed description of the push button assembly 30, with due alteration of details.

It is understood that the invention may be embodied in other forms without departing from the spirit thereof. Thus, the present examples and embodiments are to be considered in all respects as illustrative and not restrictive, and the invention is not to be limited to the details given herein.

What is claimed is:

1. A push button assembly comprising:
    a spring member to be secured to a computer bezel, the spring member comprising a rod, at least one crook extending from the rod, and a deformable arm extending from one crook, the deformable arm in turn comprising a connecting portion, a receiving portion and a neck; and
    a button movably accommodated in the receiving portion of the spring member proximate to the neck and the connecting portion of the spring member.

2. The button assembly as claimed in claim 1, wherein the receiving portion of the spring member is dimensioned to allow the button to slide freely along the receiving portion.

3. The button assembly as claimed in claim 1, wherein the neck of the spring member is substantially V-shaped for preventing the button from moving out of the receiving portion.

4. The button assembly as claimed in claim 1, wherein the receiving portion of the spring member opposes the crook where the deformable arm extends.

5. The button assembly as claimed in claim 1, wherein the button is substantially semi-cylindrical and comprises a concave flank and a convex flank, and wherein the grooves are respectively defined in the concave and convex flanks.

6. The button assembly as claimed in claim 1, wherein the button defines a pair of grooves in opposite flanks thereof.

7. A bezel assembly comprising:
    a computer bezel defining an aperture therein and forming at least one locking block at an inner surface thereof;
    a spring member comprising a rod, at least one crook extending from the rod and an engaging portion extending from the crook, each crook engaging with one corresponding locking block for securing the spring member to the bezel; and
    a button movably received in the aperture of the computer bezel, the button comprising a convex flank and a sliding portion defined in the flank, whereby the button is slidable along the engaging portion of the spring member and is thereby freely slidable in the aperture.

8. The bezel assembly as claimed in claim 7, wherein the engaging portion of the spring member comprises a connecting portion, a substantially U-shaped receiving portion and a substantially V-shaped neck, and wherein the sliding portion of the button comprises a groove for slidably accommodating the receiving portion.

9. The bezel assembly as claimed in claim 8, wherein the receiving portion of the spring member substantially opposes one crook of the spring member.

10. The bezel assembly as claimed in claim 7, wherein the engaging portion of the spring member comprises a connecting portion and a free end portion extending from the connecting portion, and wherein the sliding portion of the button comprises a through hole for slidably receiving the free end portion.

11. The bezel assembly as claimed in claim 10, wherein the free end portion of the spring member is substantially parallel to the rod of the spring member.

12. The bezel assembly as claimed in claim 7, wherein the button is substantially semi-cylindrical.

13. A bezel assembly comprising:
    a computer bezel defining an aperture therein and forming two locking regions on an inner face and by two sides of said aperture;
    a wire spring including an elongated rod section extending transversely across said aperture and locked to said two locking regions, a connection portion reversely extending from the rod section in a cantilever manner with an engaging portion at a distal end thereof; and
    a button retained by said engaging portion and received in the aperture, wherein said button is not only moveable relative to the aperture in an axis thereof but also somewhat rotatable relative to the aperture about said axis thereof.

* * * * *